Sept. 11, 1962 A. E. DE JONG 3,054,068

LINEAR AMPLIFIER USING TRANSISTORS

Filed March 14, 1960 3 Sheets-Sheet 1

INVENTOR
ARTHUR E. DE JONG,
BY Robert H. Himes
ATTORNEY.

Sept. 11, 1962 A. E. DE JONG 3,054,068

LINEAR AMPLIFIER USING TRANSISTORS

Filed March 14, 1960 3 Sheets-Sheet 2

INVENTOR.
ARTHUR E. DE JONG,
BY Robert W. Hines
ATTORNEY.

Sept. 11, 1962 A. E. DE JONG 3,054,068

LINEAR AMPLIFIER USING TRANSISTORS

Filed March 14, 1960 3 Sheets-Sheet 3

INVENTOR.
ARTHUR E. DE JONG,
BY
Robert H. Himes
ATTORNEY.

3,054,068
LINEAR AMPLIFIER USING TRANSISTORS

Arthur E. De Jong, Bellflower, Calif., assignor to Hughes Aircraft Company, Culver City, Calif., a corporation of Delaware Filed Mar. 14, 1960, Ser. No. 14,988
5 Claims. (Cl. 330—24)

This invention relates to an absolute amplifier and more particularly to an apparatus for providing linear voltage amplification of the absolute magnitude of an applied input signal with respect to a substantially fixed reference potential which may be ground.

An amplifier of the type herein disclosed has several applications such as, for example, in moving-target-indication radar systems or regulated power supplies. In prior art apparatus the function of the disclosed apparatus has been realized by employing two differential amplifiers with one input of each differential amplifier connected to a reference bus or terminal maintained at a substantially fixed reference potential and the remaining inputs constituting the input terminals to the apparatus. An output is provided by taking one output connection from each differential amplifier, the output from one differential amplifier being taken from the respective first stage and the output from the remaining differential amplifier being taken from the respective second stage. A disadvantage of this type of apparatus is that in addition to having severe drift, four transistors are required together with the concomitant cost compared to one transistor in the apparatus of the present invention. The increased number of transistors used in the prior art apparatus also decreases the reliability over that possible to achieve with apparatus of the type herein disclosed.

It is therefore an object of the present invention to provide an improved absolute voltage amplifier.

Another object of the present invention is to provide an apparatus for producing an output signal that is of a fixed polarity and of an amplitude that is a linear function of the amplitude of an input signal relative to a substantially fixed reference potential level.

Still another object of the present invention is to provide an absolute voltage amplifier which utilizes a minimum number of transistors and other components.

In accordance with the present invention, an input signal is employed to bias first and second diodes in a manner such that the anode of the first diode follows excursions of the signal which are negative with respect to a substantially fixed reference potential and the cathode of the second diode follows excursions of the signal which are positive to the substantially fixed reference potential. Additional diodes are employed to maintain the anode of the first diode at the reference potential when the signal is positive and the cathode of the second diode at the reference potential when the signal is negative. Lastly, the anode of the first diode is connected to the base, and the cathode of the second diode is employed to drive the emitter of a p-n-p type transistor whereby the signal available at the collector thereof is a signal of only positive polarity relative to a substantially fixed negative potential level and of an amplitude that is linearly proportional to the amplitude of the input signal relative to the reference potential. Alternatively, a negative polarity output signal relative to a substantially fixed positive potential may be produced by utilizing an n-p-n type transistor, a substitution which is deemed well within the scope of the teachings of the present disclosure of invention. Further, the reference potential may be chosen so that the substantially fixed positive or negative potentials are at ground.

The above-mentioned and other features and objects of this invention and the manner of obtaining them will become more apparent by reference to the following description taken in conjunction with the accompanying drawings, wherein.

The drawings illustrate a schematic circuit diagram of a preferred embodiment of the absolute amplifier of the present invention. In describing the apparatus of the present invention, ground potential will be used as the substantially fixed reference potential. It will be understood, however, that any substantially fixed reference potential may be employed without departing from the spirit and scope of the invention.

Figure 1:
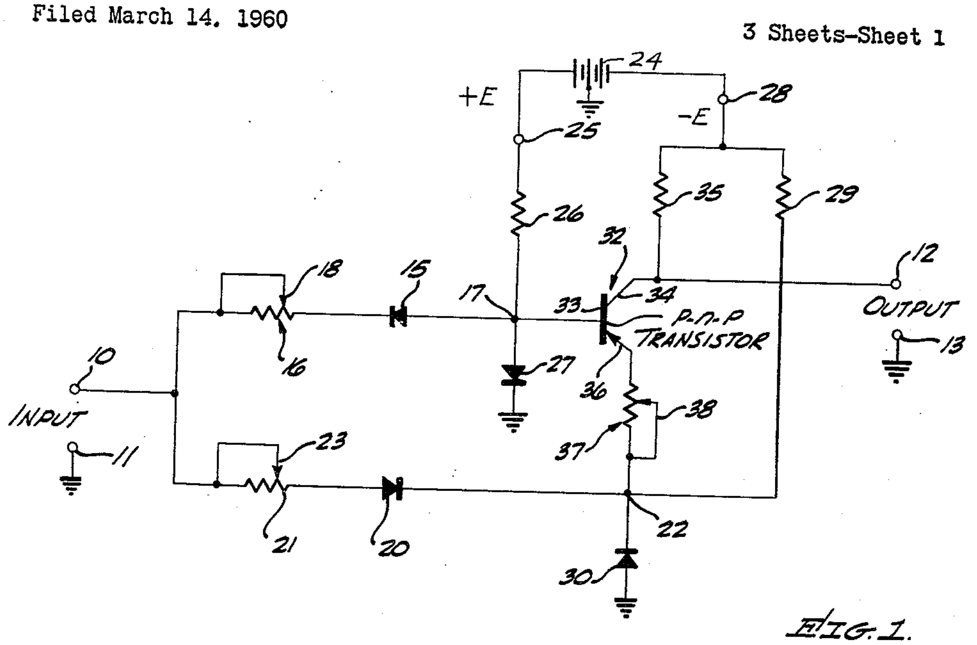
FIG. 1 illustrates a schematic circuit diagram of a preferred embodiment of the present invention.

Referring now to FIG. 1, the apparatus comprises an input provided by input terminals 10, 11 and an output available at terminals 12, 13, the input terminal 11 and the output terminal 13 of which are both connected to ground. A diode 15 is connected in series with a rheostat 16 between the input terminal 10 and a junction 17. The rheostat 16 includes an adjustable tap 18 which is connected to one extremity of the rheostat 16 whereby the resistance of the rheostat may be adjusted by positioning the tap 18. Further the diode 15 is poled so as to allow current to flow only towards the input terminal 10. Similarly, a diode 20 is connected in series with a rheostat 21 from the input terminal 10 to a junction 22. As before, the rheostat 21 includes an adjustable tap 23 which is connected to one extremity of the rheostat 21 so that the resistance thereof may be adjusted by positioning the tap 23. The diode 20, however, is poled so as to allow current to only flow away from the input terminal 10. Both the rheostats 16 and 21 have a resistance which may be of the order of 100 ohms each. Also, in order to achieve symmetrical operation, the rheostats 16 and 21 are adjusted so that the voltage drops for equivalent currents are the same across diode 15 and rheostat 16 and diode 20 and rheostat 21.

A battery 24 having an intermediate terminal connected to ground provides a source of positive potential at the positive terminal thereof and a source of negative potential at the negative terminal thereof. The positive terminal of battery 24 is connected to a terminal 25 which, in turn, is connected through a resistor 26 to the junction 17. The resistance of resistor 26 may, for example, be of the order of one megohm. In addition, the potential of junction 17 is prevented from going positive by connecting a diode 27 from the junction 17 to ground and poled in a manner to allow current to flow from the junction 17 to ground. Similarly, the negative terminal of battery 24 is connected to a junction 28 which, in turn, is connected through a resistor 29 to the junction 22, the resistance of resistor 29 being of the order of one megohm. Also, the potential of junction 22 is prevented from going negative by connecting a diode 30 between junction 22 and ground and poling the diode 30 so as to allow current to flow from ground to the junction 22.

Lastly, a p-n-p type transistor 32, includes a base 33 which is connected to the junction 17, a collector 34 which is connected to the output terminal 12 and through a load resistor 35 to the terminal 28, and an emitter 36 which is connected through a rheostat 37 to the junction 22. The rheostat 37 includes an adjustable tap 38 which is connected to one extremity thereof so that the resistance between emitter 36 and junction 22 may be adjusted by positioning the tap 38.

Figure 2:
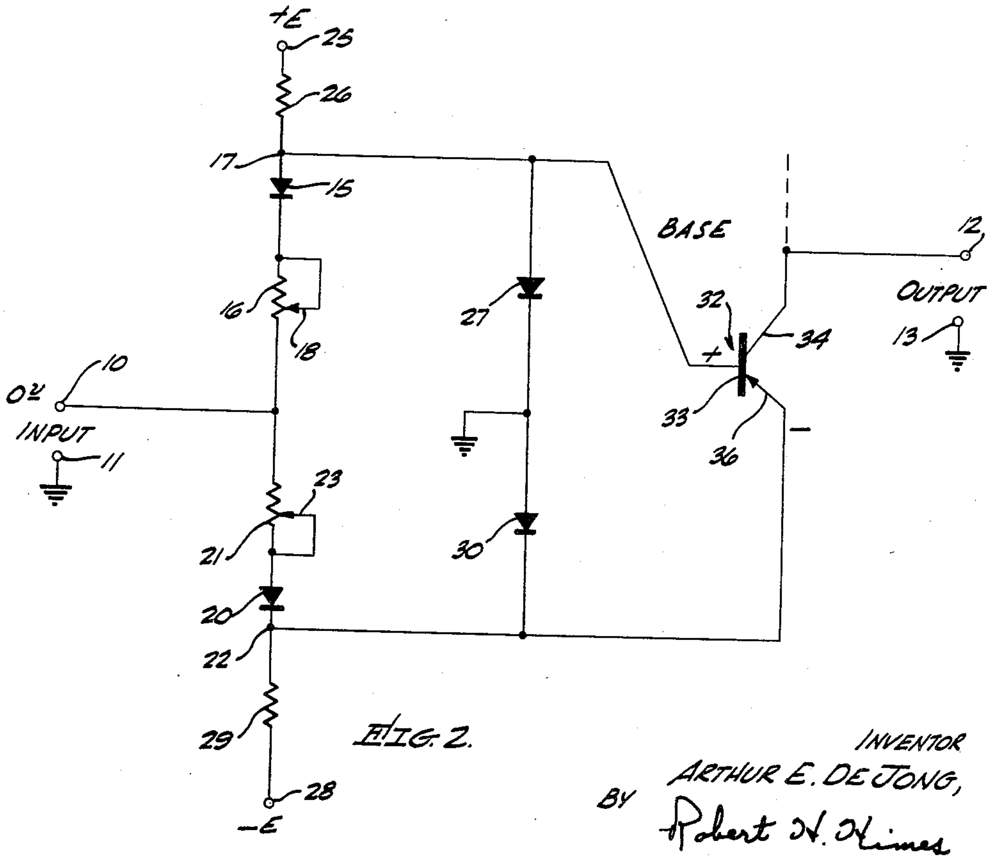
FIG. 2 shows the equivalent circuit of the apparatus of FIG. 1 when an input signal of zero volts is applied to the input thereof.
Figure 5:
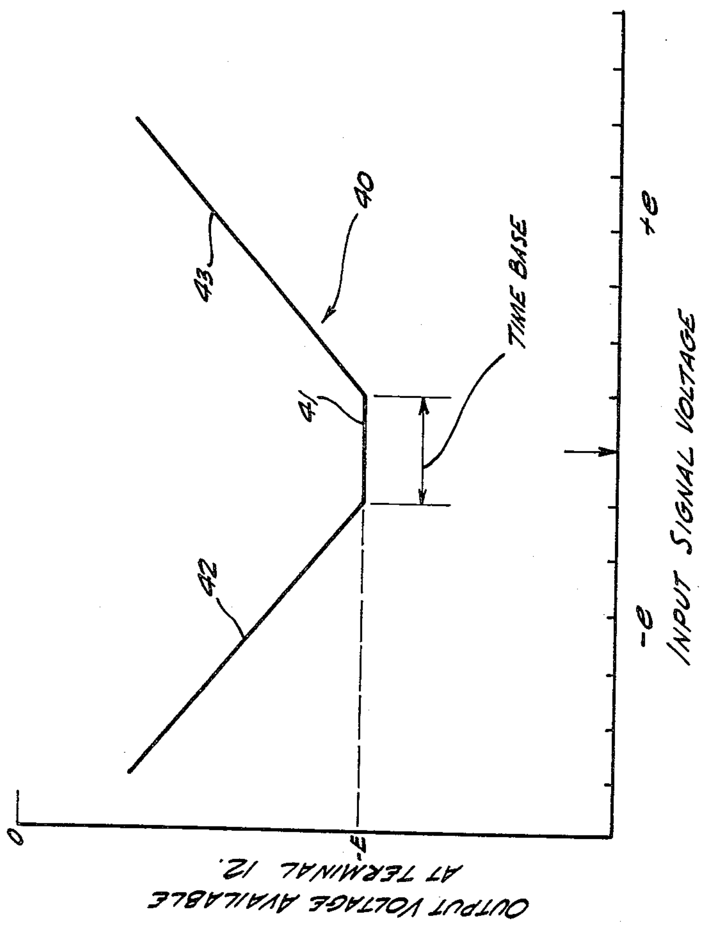
FIG. 5 shows a characteristic of the output voltage versus input signal voltage.

In the operation of the device of the present invention, there are three different states of operation as evidenced by the discontinuities in characteristic 40, FIG. 5; namely, when the input signal applied to the input terminals 10, 11 is within a range of voltages that is sufficiently near zero to cut-off the transistor 32 and when the input signal is positive and when the input signal is negative with respect to this range. Referring to FIG. 2, there is shown the equivalent circuit of the apparatus of FIG. 1 when a zero volt input signal or other voltage that is sufficiently low to cut-off the transistor 32 is applied to the input terminal 10. Generally, a current will flow from the source of positive potential applied to terminal 25 to the terminal 28, which terminal is maintained at a negative potential. Further, the junction between rheostats 16 and 21 is at zero volt due to its being connected to the input terminal 10. Thus, the junction 17 intermediate the resistor 26 and the diode 15 will be slightly positive with respect to ground due to the current flow through the diode 15 and rheostat 16. The extent to which this junction goes positive, however, is limited by the diode 27 which allows additional current to flow through the resistor 26 thus dropping the voltage at junction 17 to a voltage relative to ground that is just equal to the voltage-drop across the diode 27.

The junction 22, on the other hand, is slightly negative with respect to ground due to current flow through the rheostat 21 and the diode 20. Similarly, the extent to which junction 22 is allowed to go negative is limited by the diode 30 which allows current to flow from ground to the junction 22, thus limiting the extent to which junction 22 can go negative. Thus, a slightly positive voltage is applied to the base 33 of transistor 32 and a slightly negative voltage is applied to the emitter 36 thereby cutting off current flow through the transistor 32 whereby the supply voltage, —E, will be available at the output terminal 12. An impedance connected across the output terminals 12, 13 will, of course, decrease the magnitude of this potential. The range through which the transistor will remain cut-off is referred to as the "time-base" and is the portion 41 of the characteristic 40, FIG. 5. The width of the time-base 41 may be controlled by adjusting the position of tap 38 of rheostat 36. For minimum time-base, the resistance of rheostat 37 is reduced to zero and germanium diodes are employed.

Figure 3:
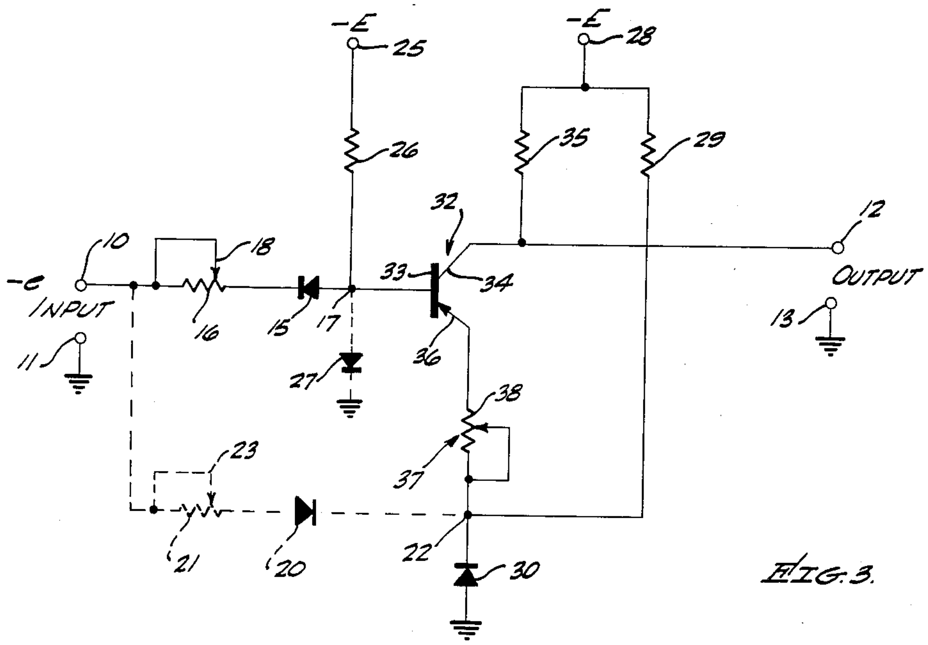
FIG. 3 shows the equivalent circuit of the apparatus of FIG. 1 when a negative polarity input signal is applied to the input thereof.

Referring to FIG. 3, there is shown an equivalent circuit of the apparatus of FIG. 1 when a negative voltage, $-e$, is applied to the input terminal 10. When a negative voltage, $-e$, is applied to input terminal 10, the diodes 27 and 20 are back-biased wherein these diodes 20, 27 introduce a substantially infinite impedance in the portions of the circuit wherein they are connected whereby these portions conduct negligible current and may be neglected. Thus, as shown in FIG. 3, the positive voltage applied to terminal 25 allows a current to flow through the resistor 26, diode 15 and rheostat 16 to the input terminal 10, the latter of which is at the input voltage, $-e$. The total voltage drop across the rheostat 16 and the forward drop across the diode 15 is negligible compared to the drop across the resistor 26 whereby the voltage at junction 17 is substantially at the same level as the voltage, $-e$, applied to the input terminal 10. This voltage at junction 17 is applied to the base 33 of the transistor 32. The emitter 36 of transistor 32, on the other hand, is maintained at substantially ground potential by the diode 30. This being the case, the output signal available on the collector 34 will be of positive polarity relative to —E and proportional to the voltage difference between the base 33 and the emitter 36. As is evident from the foregoing description, this voltage difference is substantially equal to the amplitude of the voltage applied to the input terminal 10. The signal that is positive relative to —E developed at the collector 34 is made available at the output terminal 10 by means of an appropriate connection thereto. A portion 42 of the characteristic 40 describes the relation of the output signal when a signal of this type is applied to the input terminals 10, 11.

Figure 4:
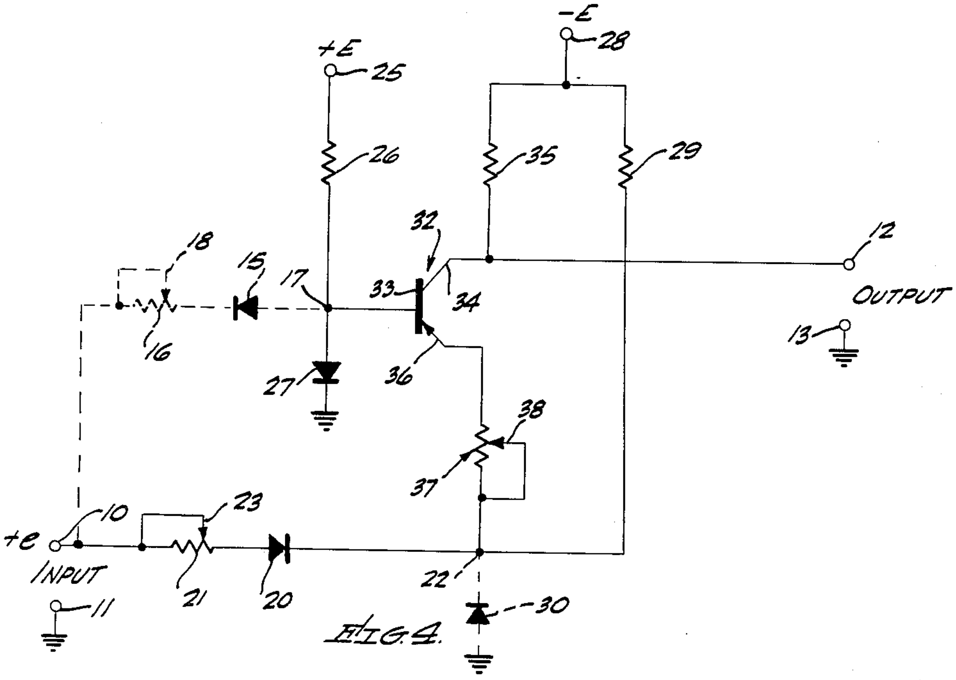
FIG. 4 shows the equivalent circuit of the apparatus of FIG. 1 when a positive polarity input signal is applied to the input thereof.

Referring to FIG. 4, there is shown an equivalent circuit diagram of the apparatus of FIG. 1 when a positive polarity input signal, $+e$, is applied to the input terminal 10. Under these circumstances, the diodes 15 and 30 are back-biased making the current which flows through these branches of the circuit negligible. Referring to FIG. 4, current will flow from the input terminal 10 through the rheostat 21, the diode 20 and the resistor 29 to the source of negative potential which is connected to the terminal 28. As before, the drop across a rheostat 21 and diode 20 is negligible compared to the drop across the resistor 29, whereby the voltage available at the junction 22 is substantially equivalent to the input signal applied to input terminal 10. This voltage at junction 22 which in this case is positive with respect to ground is applied through the rheostat 37 to the emitter 36 of the transistor 32. The base 33 of transistor 32, on the other hand, is connected to the junction 17 between the resistor 26 and the diode 27. Current flows from the source of positive potential applied to terminal 25 through the resistor 26 and the diode 27 to ground. The forward impedance of the diode 27 is sufficiently small compared to the resistance of resistor 26 as to make the potential of the junction 17 substantially equal to ground potential. Thus, the base 33 of transistor 32 is again negative with respect to the emitter 36 by an amount equal to the amplitude of the input signal applied to the input terminal 10. This input voltage is applied across the emitter 36 and base 33 whereby transistor 32 generates a positive output signal relative to the supply voltage, —E, at its collector 34, which output signal is applied to the output terminal 12. The portion 43 of the characteristic 40 shows the manner in which the output signal varies for a positive signal applied to the input terminals 10, 11.

Thus, irrespective of whether a negative input signal, $-e$, or a positive input signal, $+e$, is applied across the input terminals 10, 11, it is evident that the output signal available at output terminals 12, 13 will be positive relative to the supply voltage, —E. In the event it is desired to have a negative polarity output signal, a n-p-n type transistor is substituted for the p-n-p transistor 32 and the manner in which the diodes 15, 20, 27 and 30 are poled is reversed along with the polarities of the voltages applied to the terminals 25, 28. Further, the rise time and fall time of the apparatus are basically determined by the type of transistor 32 and diodes 15, 20, 27 and 30 which are employed.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An apparatus for providing voltage amplification of the absolute magnitude of an applied input signal, said apparatus comprising first and second unidirectionally conducting devices connected in series and poled to allow current to flow in a single direction therethrough from a first junction to a second junction, said input signal being applied to the common junction between said first and second unidirectionally conducting devices; means connected to said first junction and including a third unidirectionally conducting device for causing the potential level thereat to follow the excursions of said input signal which are of one fixed polarity with respect to a substantially fixed reference potential; means connected to said second junction and including a fourth unidirectionally conducting device for causing the potential level thereat to follow excursions of said input signal which are of a polarity opposite to said one fixed polarity with respect to said substantially fixed reference potential; and amplification means coupled to said first and second junctions and responsive to the signal developed thereacross for producing a single-polarity output signal relative to a substantially fixed potential that is representative of the absolute magnitude of said input signal.

2. An apparatus for providing voltage amplification of the absolute magnitude of an applied input signal, said apparatus comprising first and second input terminals, said second input terminal being connected to a reference junction maintained at a substantially fixed reference potential; first and second unidirectionally conducting devices connected in series and in the order named from a first junction to a second junction and poled to allow current flow in a single direction between said first and second junctions, said first input terminal being connected to the common junction between said first and second unidirectionally conducting devices; a third unidirectionally conducting device connected from said first junction to said reference junction and poled to allow current flow in the same direction as said first unidirectionally conducting device with respect to said first junction; a fourth unidirectionally conducting device connected from said second junction to said reference junction and poled to allow current flow in the same direction as said second unidirectionally conducting device relative to said second junction; first and second impedance elements each having one extremity connected, respectively, to said first and second junctions; means for maintaining a potential difference across the remaining extremities of said first and second impedance elements, said potential difference having a polarity to allow current to normally flow through said first and second unidirectionally conducting devices and being referenced to said substantially fixed reference potential at a point substantially intermediate the potentials applied to the remaining extremities of said first and second impedance elements; and amplification means coupled to said first and second junctions and responsive to the signal developed thereacross for producing an output signal of a single polarity and of an amplitude representative of the absolute magnitude of said input signal.

3. An apparatus for providing voltage amplification of the absolute magnitude of an applied input signal, said apparatus comprising first and second input terminals and first and second output terminals, said second input and said second output terminals being connected to ground; first and second diodes connected in series from a first junction to a second junction and poled to allow current to flow from said first junction to said second junction, said first input terminal being connected to the common junction between said first and second diodes; a third diode connected from said first junction to ground and poled to allow current to flow from said first junction to ground; a fourth diode connected from said second junction to ground and poled to allow current to flow from ground to said second junction; a first resistor having one extremity connected to said first junction; a second resistor haivng one extremity connected to said second junction; means for maintaining the remaining extremity of said first resistor positive and the remaining extremity of said second resistor negative with respect to ground; a p-n-p type transistor having a base, an emitter and a collector, said base being connected to said first junction, said emitter being connected to said second junction and said collector being connected through a load resistor to a source of negative potential thereby to produce an output signal at said collector that is positive with respect to said negative potential and of an amplitude that is proportional to the absolute amplitude of said input signal.

4. The apparatus for providing voltage amplification of the absolute magnitude of an applied input signal as defined in claim 3, which additionally includes first and second adjustable resistors connected in series with said first and second diodes, respectively, for equalizing the voltage drop thereacross.

5. The apparatus for providing voltage amplification of the absolute magnitude of an applied input signal as defined in claim 3, which additionally includes an adjustable resistor interposed between said emitter and said transistor and said second junction for controlling the time-base of said apparatus.

References Cited in the file of this patent

FOREIGN PATENTS 814,409 Great Britain ------------ June 3, 1959